United States Patent

[11] 3,582,763

| [72] | Inventor | Erich Huber |
| | | Sipplinger Str. 8, 8 Munich 60, Germany |
| [21] | Appl. No. | 782,836 |
| [22] | Filed | Dec. 11, 1968 |
| [45] | Patented | June 1, 1971 |
| [32] | Priority | Dec. 15, 1967 |
| [33] | | Germany |
| [31] | | P1613891.3 |

[54] SEMICONDUCTOR CIRCUIT FOR TEMPERATURE INTERMITTENT OPERATION
20 Claims, 8 Drawing Figs.

[52] U.S. Cl.................................................. 323/9,
321/45C, 323/20, 323/22SC
[51] Int. Cl........................................................ G05f 1/58
[50] Field of Search.......................................... 307/252,
252 C, 308; 321/45 C, 45 ER, 45; 323/22 SCR, 68, 19, 23, 9, 20

[56] References Cited
UNITED STATES PATENTS

| 3,242,352 | 3/1966 | Long | 307/252X |
| 3,278,823 | 10/1966 | Ross | 323/22X(SCR) |
| 3,365,640 | 1/1968 | Gurwicz | 323/23X |
| 3,371,231 | 2/1968 | Burley | 307/308 |
| 3,407,349 | 10/1968 | Lehrer et al. | 321/45 |

*Primary Examiner*—William M. Shoop, Jr.
*Assistant Examiner*—A. D. Pellinen
*Attorney*—Smyth, Roston & Pavitt ABSTRACT: Control circuits for the intermittent control of load current particularly as to the production of switching trigger signals for turning load current on and off in cyclic operation. Duty cycle and duty factor are controlled by phase control of sequentially effective turning on and turning off pulses, using external control signals as well as control from the temperature of the principal, load current conducting switching element, wherein the temperature control is effective as an override in ranges close to a temperature of destruction of the element.

SSH — SINGLE SHOT
MMV MONOSTABLE -
MULTIVIBRATOR

SSH - SINGLE SHOT
MMV MONOSTABLE-
MULTIVIBRATOR

INVENTOR:
Erich Huber

ATTORNEYS

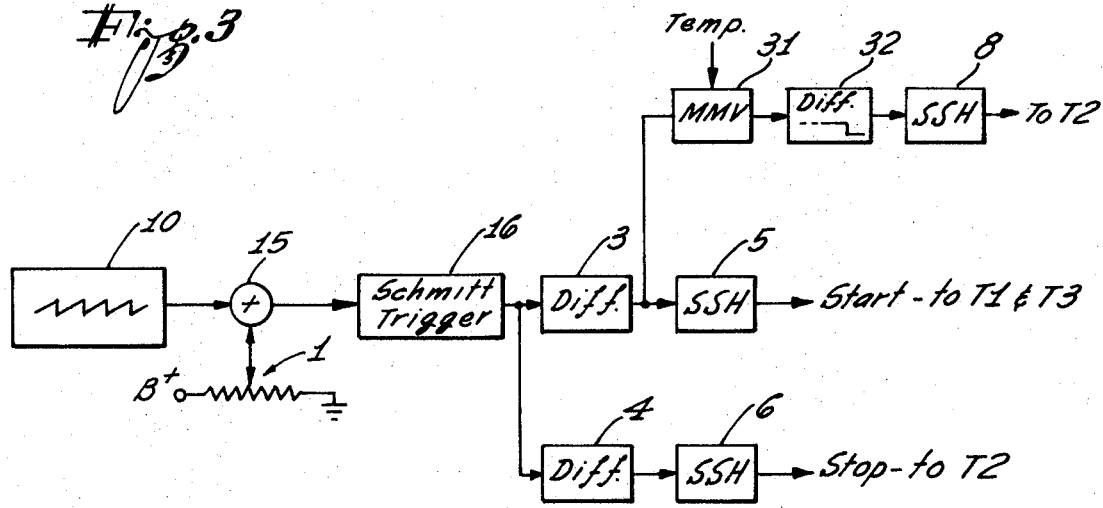
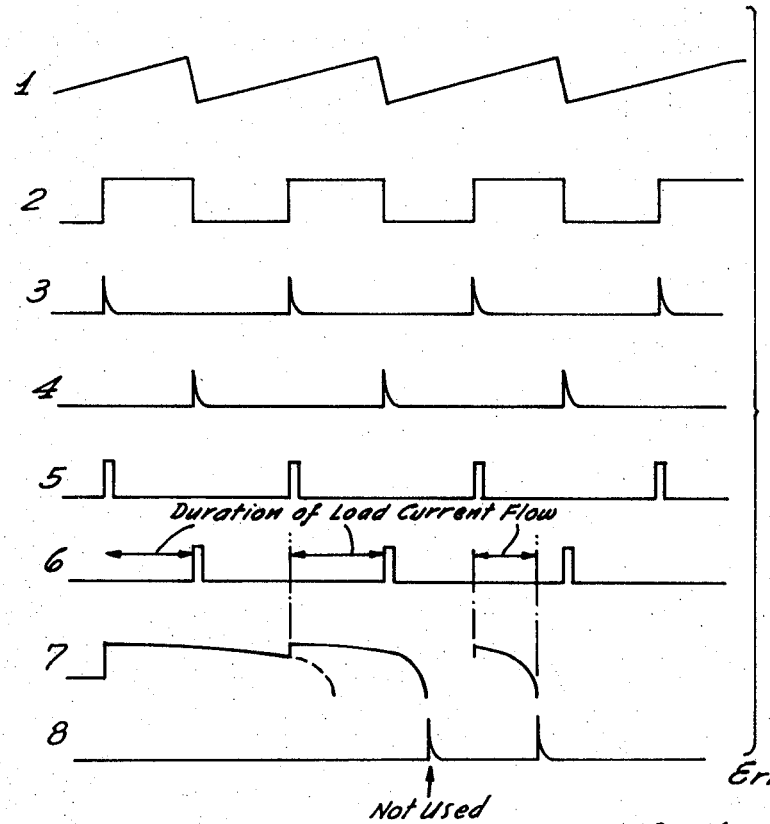

AMV— ASTABLE MULTIVIBRATOR
MMV— MONOSTABLE-MULTIVIBRATOR 3,582,763

SEMICONDUCTOR CIRCUIT FOR TEMPERATURE INTERMITTENT OPERATION

The present invention relates to improvements in control circuits for the intermittent operation of electrical equipment. It is known to operate electrically powered vehicles through pulsating, i.e., intermittently occuring current pulses. This relates particularly to forklifts, such as fork stacking trucks, electrically operated general utility trucks, or the like. Devices of this type receive electric power and energy in the form of voltage and current pulses applied, usually regularly, to the electric drive thereof. The duration of a current pulse and of the respectively succeeding pause is often referred to as a duty cycle, and the ratio of current pulse duration to duty cycle is the duty factor. While the terminology is not always consistently used in this manner, it will be used in the present specification, as defined above.

It is known, particularly, to employ thyristors for turning on and turning off of voltage and current flow as applied to the load to obtain intermittent operation thereof. In general, a thyristor is a semiconductor element which is "fired" in a manner analogous to a thyratron. For turning a thyristor off, it is necessary to either reverse the polarity of the drive voltage across the main electrodes or by applying a particular counter voltage thereacross so that a compensating current extinguishes current flow in the thyristor. Transistors have also been used as switching elements for controlling intermittent operation, but the conductivity of a transistor depends on the voltage applied across the main electrodes and is maintained only as long as an "on" pulse is applied to the control electrode of the transistor.

Control circuits for intermittent operation of thyristor type switching circuits require, in general, particular circuitry for turning off of load current flow. This circuitry includes, for example, another pulse controlled thyristor fired to force compensating current through the principal, load current conducting thyristor. This holds true even if the driving voltage is AC but if it is desired for any purpose to turn off load current before natural zero crossing of the current.

It is a specific characteristic of all semiconductor elements that they operate properly only if the temperature of the semiconductive material does not exceed certain predetermined limits. It follows that care must be taken in that thermo overload does occur in such element. For this purpose, it is already known to include temperature sensitive elements in the housing, for example, in the carrier plate for such a semiconductor switch, and the electrical characteristics of such an element, such as a thermo element or a thermo resistor, is utilized as a representation for the temperature of the semiconductor device.

It is an object of the present invention to provide a circuit for intermittently operating devices, for protecting the semiconductor switching element employed against thermal overload. In accordance with the object of the present invention, the control circuit improved with the principles of the present invention uses thyristors as semiconductor switches, whereby load current is turned on by a sequence of starting pulses and load current is turned off by a sequence of stop or turnoff pulses, respectively interspaced with the starting or turn-on pulses. Within the definition given above, the period between succeeding start pulses is the duty cycle and the ratio of phase shift between a start pulse and the respectively succeeding turn off pulse over the duty cycle is the duty factor.

In accordance with the principal feature of the invention the duty factor is controlled or limited at least within a critical temperature range by a signal developed as representation of temperature of the load current switching semiconductor element, and influencing the relationship between operating start and stop pulses. A particular advantage of the circuit in accordance with the present invention is to be seen in that the intermittent load current can be limited in a manner which is independent from external adjustments for power and energy to be supplied to the load. In other words, the system, in accordance with the invention, permits employment of intermittent operation at variable power, whereby independently from the adjusted load current and power input, the temperature control operates as a variable or fixed limit and in cases provides a temporary override for the otherwise adjusted duty factor control for the load.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

FIG. 3 illustrates a block diagram of still another embodiment of the present invention;

FIG. 3a illustrates waveforms of relevant signals developed in the circuit shown in FIG. 3;

Figure 1:
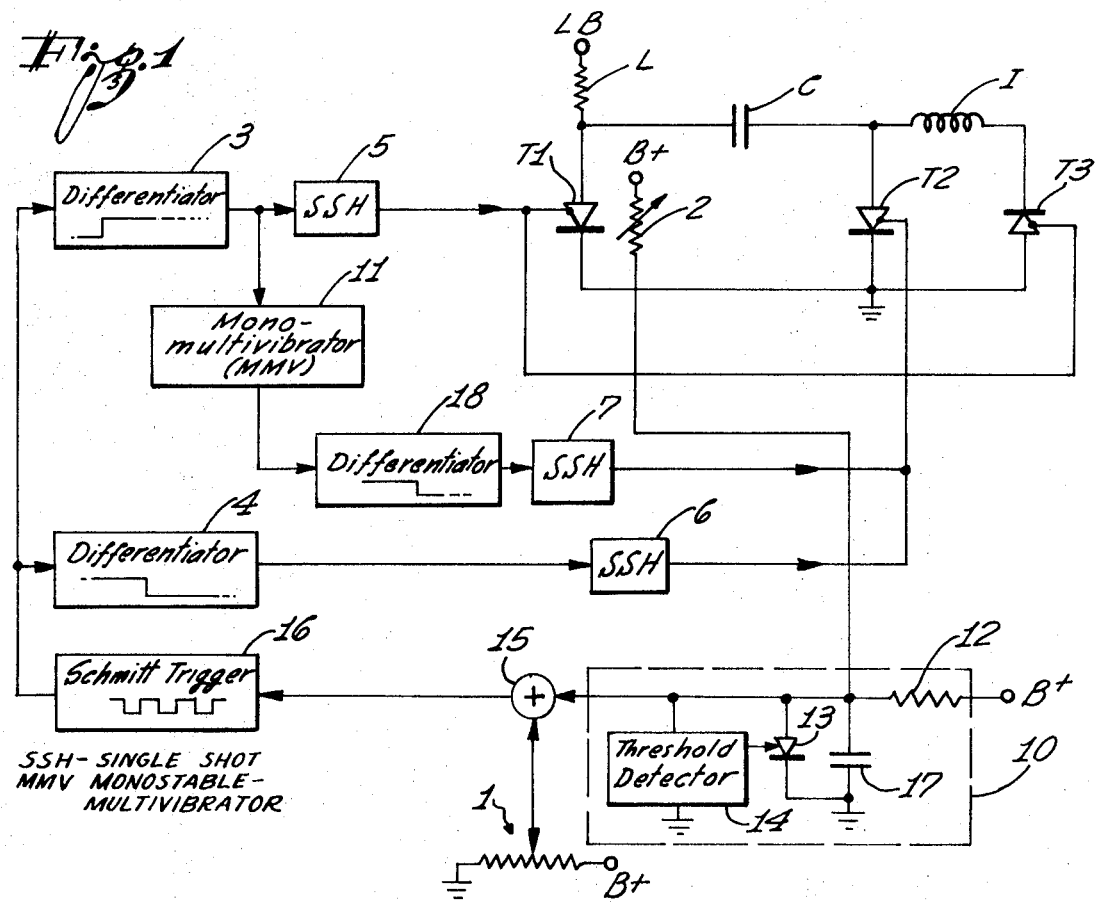
FIG. 1 illustrates a block diagram of the preferred embodiment of the present invention.

Proceeding now to the detailed description of the drawings and turning first to the description of FIG. 1, there is illustrated the preferred embodiment in accordance with the present invention. The general principle underlying the circuit shown in this figure, is to be seen in that a measuring current which depends upon the temperature of a load switching semiconductor element, influences similarly the pulse rate frequency of start and stop or turnoff pulse trains for a constant duty factor, while the phase between start and turnoff pulses is subject to external control, and the duty factor is limited through the development of additional turnoff pulses effective in critical cases as early turnoff of the load current.

In FIG. 1 a load L is connected, for example, to a positive voltage supply terminal LB and current flow through the load is controlled through a first thyristor T1 having, for example, grounded collector electrode. Considering the thyristor as an equivalent to a controlled rectifier, this collector electrode is equivalent to the rectifier cathode, and the anode connects to load L. The control electrode of thyristor T1 receives starting pulses developed in accordance with the present invention, as will be described below.

For turning off of the current flow in the load, the load current through thyristor T1 has to be extinguished. For this purpose there is provided a capacitor C operatively connectable through a second thyristor T2 across thyristor T1 whereby the direction of easy conduction in thyristor T2 causes a load current extinguishing, compensating current to be driven into the thyristor T1 by operation of the discharge of a capacitor C. The thyristor T2 is controlled, i.e., triggered, by turnoff pulses, to be developed in accordance with invention.

After load current flow through thyristor T1 has been extinguished by operation of capacitor discharge through thyristor T2, current flow through the latter continues until the capacitor C is charged to a voltage approximately equal to the voltage LB relative to ground. For providing extinction of load current flow through thyristor T1 *after* the next turn-on pulse, the polarity of the voltage across the capacitor has to be reversed. This is conveniently carried out at beginning of the next load current flow through thyristor T1. For this purpose there is provided a third thyristor T3 operated, i.e., triggered, concurrently with the thyristor T1. The direction of easy current conduction through thyristor T3 is selected in that thyristor T3 is connected in series with conducting thyristor T1. In addition, an inductance I is connected in series with thyristor T3 and capacitor C.

As the two thyristors T1 and T3 fire, the capacitor C discharges and recharges oscillatorily, as the capacitor together with the inductance 1 form a resonance circuit. After a half wave period of such oscillation, the capacitor C is, in effect, recharged to the opposite polarity. The resulting voltage on the capacitor has reverse polarity as far as direction of current conduction through thyristor T3 is concerned, so that thyristor T3 will extinguish and capacitor C keeps its reversed charge, until the next stop pulse fires thyristor T2 and thereupon capacitor C discharges to extinguish load current flow in the thyristor T1, as aforedescribed.

Operation of this load current switching circuit is mentioned here only for reasons of completion, however, in my copending application SN782,634, filed Dec. 10, 1968. I have disclosed an improved control circuit of this type, and the improved control circuit is, of course, equally applicable for practicing the invention of the present application. In general, the invention is applicable to all pulse controlled load current switching circuits for intermittent operation and wherein thermal overload may occur.

Proceeding now to the description of the features of the invention, the development of the start and stopping pulses utilized in the circuit described in the previous paragraph will now be explained more fully. This involves, particularly, the development of the start pulses applied concurrently to thyristors T1 and T3 and the development of extinguishing or turnoff pulses applied to thyristor T2.

The duty factor is determined by a first adjustable element 1 which, for example, is a variable resistor connected between ground and a voltage source B+ to develop a control signal representative of the desired power and energy to be supplied to the load L. The second control element ultimately used for determining the operating duty factor is a temperature sensitive resistor 2 physically located in the proximity of the semiconductor material of the load switching thyristor T1. The resistor 2 may be embedded in the housing or the baseplate of the thyristor to assume the temperature thereof. Resistor 2 is electrically connected, for example, between the voltage pulse B+ or another biasing source of potential and the control circuit, to be described next.

A sawtooth voltage is, for example, developed in a generator 10 which can be of any convenient type; it can be an astable multivibrator or any kind of suitable relaxation oscillator or the like. For reasons of simplification, the principles of this type oscillator are explained by using functionally representative elements. A capacitor 17 is charged, for example, through a resistor 12 from voltage source B+. The junction of capacitor 17 and resistor 12, therefore, exhibits a rising voltage, linear within the usual limits and at a slop depending upon the RC relationship of resistor 12 and capacitor 17.

A threshold level detecting circuit element 14 monitors the level of this rising voltage at any instant. As a particular level is exceeding, a switching element 13 of any suitable type, preferably a semiconductor element is operated by detector 14 to close a short circuit across capacitor 17 to discharge same. As this causes the signal level at the junction of capacitor 17 and resistor 12 to drop below the threshold response level of device 14, the switch is opened again and the cycle is repeated.

Figure 1A:
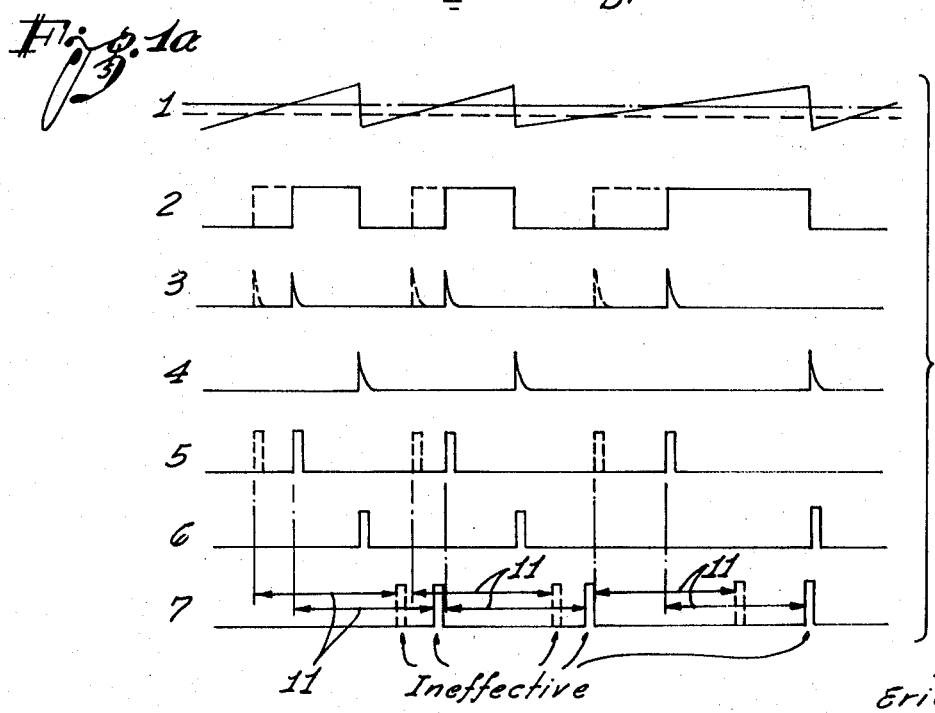
FIG. 1a is a plot of waveforms of relevant signals as developed in the circuit shown in FIG. 1.

The two principle input signals for the control system, as derived from elements 1 and 2, are now used in this embodiment to modify the production of an output by generator 10. First of all, a summing network 15, for example, negatively sums the DC voltage as adjusted by the control input device 1, and the sawtooth voltage as generated by generator 10. Line 1 in FIG. 1a shows the sawtooth wave as developed, and the two horizontal lines, one solid, one dashed, represent two different adjustments of device 1. Where the sawtooth line crosses the adjusted horizontal levels summing device 15 has output zero and changes the polarity of its output. The resulting output of device 15 is used to trigger a Schmitt trigger circuit 16, assumed to be triggered when the output as provided by the network 15 passes through zero. Adjustment to that particular response level is used here merely for reasons of simplifying the description.

Line 2 in FIG. 1a shows the output of Schmitt trigger 16. It can be seen that adjustment of the device 1 shortens or lengthens, for example, the "on" state of the Schmitt trigger and lengthens or shortens accordingly the off state thereof, depending upon the adjustment direction of the device 1. In accordance with this first embodiment of the invention, the temperature sensitive resistor 2 is connected in the circuit of the generator 10 in such a manner that upon increasing temperature the frequency of the generated oscillations decreases. Assuming the temperature dependent resistor 2 to be connected in parallel to resistor 12, it follows that the rate of charge of the capacitor 11 decreases upon increasing resistance of resistor 2. Accordingly, a negative temperature coefficient is assumed for resistor 2 because the frequency of the generator 10 has to decrease with the temperature in this embodiment. Of course, resistor 2 could have a positive temperature coefficient but then the resistor has to be connected in series with resistor 12 (or used in lieu thereof). In either case, a decrease in frequency of the sawtooth generator 10 is the desired result for increasing the temperature in load current conducting thyristor T1.

The output of the Schmitt trigger 16 is used twofold. For example, the leading edge of each Schmitt trigger output pulse is differentiated by a polarized differentiating circuit 3 to produce the pulses shown in line 3 of FIG. 1a. A differently polarized differentiator 4 differentiates the trailing edge of each Schmitt trigger pulse, and these differentiator pulses are plotted in FIG. 1a, line 4. For normal operation, the differentiator pulses in line 3 of FIG. 1a trigger an monostable multivibrator or single shot 5 to provide triggering or firing pulses of short duration to serve for turning on thyristors T1 and T3. Line 5 in FIG. 1a illustrates these turning on pulses. The output of differentiator 4 triggers a single shot 6 which likewise provides pulses of short duration serving normally for the control of thyristor T2, which, in turn, causes the turning off of thyristor T1. Therefore, the output pulses of single shot 5 serve as the starting or turning on pulses, and the output pulses of single shot 6 serve as the turning off or extinguishing control pulses for normal operation of pulsating current flow in load L.

Upon comparing these pulses, it is apparent that the extinguishing pulses 6 actually concur at the retrace of the sawtooth waves provided by generator 10. Each retrace of the sawtooth generator causes capacitor 17 thereof to discharge rapidly, resulting in the production of each trailing edge of Schmitt trigger pulses 16, and this in turn gives rise to the production of the pulses by single shot 6. An adjustment of device 1 influences the timing of these pulses very little. For a constant frequency, therefore, it follows that the extinguishing pulses 6 follow each other at the chosen frequency and at a constant phase which is essentially independent from the adjustment by the device 1. On the other hand, adjustment of device 1, for purposes of load control, shifts the phase of the zero crossing of the output of summing network 15 in relation to the gradual slop of each sawtooth wave which, in turn, shifts the phase of the turn-on pulses 5. It follows, therefore, that normally the turnoff pulses follow at a fixed rate and phase independently from the adjustment of device 1, the respectively preceding firing pulse, however, has a phase relative to the next turnoff pulses which depends upon the adjustment of device 1; the load current and duty factor is controlled accordingly.

It will be appreciated that the temperature control exerted upon the system by the temperature variable resistor 2 changes the frequency of generator 10 and this varies the duration of the duty cycle, but the period between a turning-on and the next turning-off pulses varies proportionally thereto, so that the duty factor remains the same. Normally then, the temperature control will not change the adjusted power average as intermittently applied to the load. However, the system includes additional means which, in cooperation with the temperature sensing device, provide the desired protection in the critical temperature range.

The output pulses of the differentiator 3 (line 3 in FIG. 1a) are additionally applied to a monostable multivibrator 11, providing pulses at a fixed duration, but longer than the pulses as provided by the single shots 5 and 6. The trailing edge of these output pulses of monostable devices 11 are differentiated in the differentiator 18 to serve as inputs for a single shot 7. Line 7 in FIG. 1a shows these pulses; they are referenced in time to the pulses in line 3 and follow each of them at a constant period which is the astable period of monostable multivibrator 11 as indicated by double arrows in line 7 of FIG. 1a.

The astable period of multivibrator 11 provides a maximum turning-on period for the thyristor T1, as the output pulses of single shot 7 serve as alternate turning-off pulses for the main circuit, i.e., they can trigger thyristor T2 in the alternative, provided capacitor C has not been discharged in the meantime. This alternative operation of thyristor T2 will be effective only in those cases where the operation of the temperature control has extended the duty cycle, so that correspondingly there is always a relatively long current pulse followed by a relatively long pause. The turning-off period for load current is now limited to the duration of the astable period of multivibrator 11.

Normally a trigger pulse of single shot 6 for thyristor T2 precedes a trigger pulse from single shot 7, so that thyristor T1 is already turned off when the latter pulse arrives. The thyristor T2 cannot fire in response to a belated pulse from single shot 7 because the voltage applied across its main electrode has polarity which is reversed to the polarity needed for conduction of thyristor T2 and capacitor C has not yet reversed its charge. Therefore, the firing pulse from single shot 7 remains ineffective during a load current pause.

The circuit could be modified in that, for example, single shot 6 is triggered by the output of differentiator 18 in the alternative, so that single shot 7 could be omitted. In either case, the circuit could be modified further in that the output of Schmitt trigger 16 is coupled to the output of differentiator 18. The Schmitt trigger now serves as a clamp for the output of the differentiator 18 to clamp the output thereof to the ground level. As long as Schmitt trigger 16 is, for example, at zero level, such as ground, defining the normal turnoff period for the load current, production of an output pulse by differentiator is suppressed in order to avoid spurious responses anywhere in the system.

Figure 2:
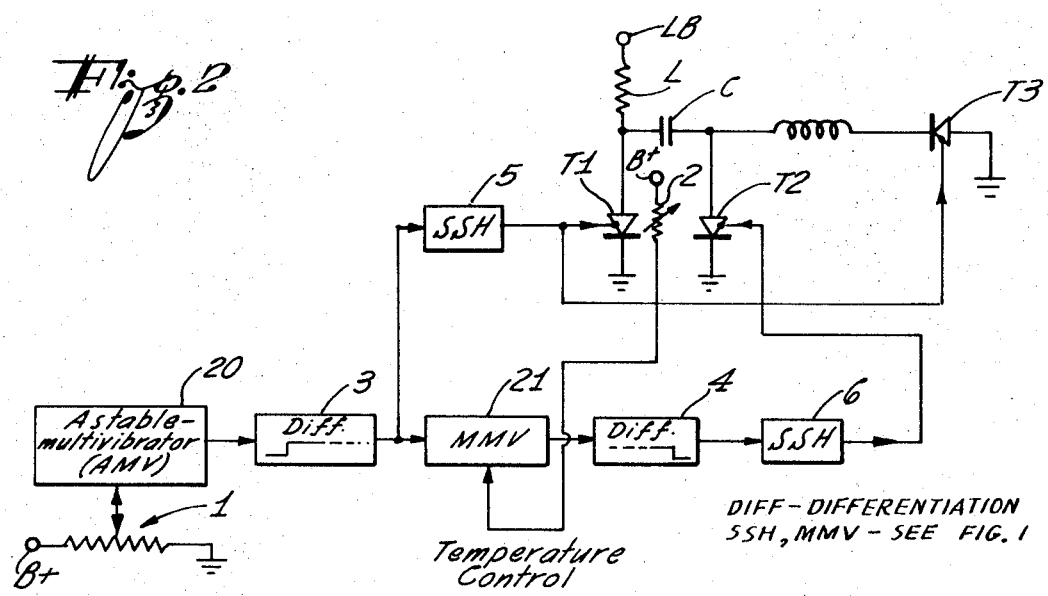
FIG. 2 illustrates a block diagram of a second embodiment of the present invention.
Figure 2A:
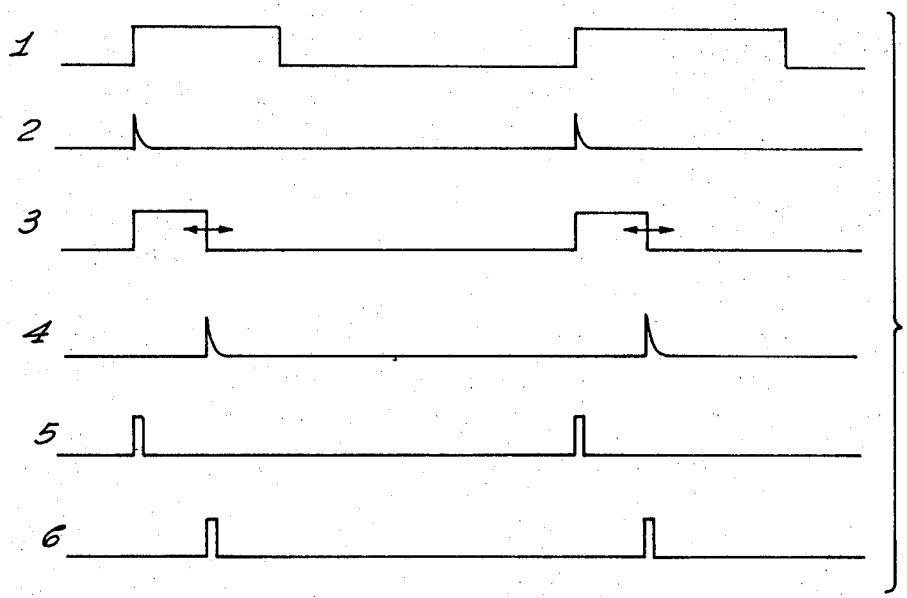
FIG. 2a illustrates waveforms of relevant signals developed in the circuit of FIG. 2.

Proceeding now to the embodiment shown in FIG. 2, the control provided here is such that the phase relation between start and turning off pulses is controlled from the temperature dependent signal while frequency of these pulse trains is controlled through the external control signal. An astable multivibrator 20 determines the frequency of the intermittent operation. As schematically indicated, multivibrator 20 is adjustable as to its period of oscillation by operation of the external control signal producing device 1. Line 1 in FIG. 2a illustrates the output signal of multivibrator 20. The output signal of the multivibrator is differentiated at its leading edge by the differentiator 3 (line 2 in FIG. 2a) which, in a manner analogous to the circuit shown in FIG. 1, controls a single shot 5 which, in turn, produces the starting and firing signal (line 5 in FIG. 2a) for thyristors T1 and T3.

The output of differentiator 3 is additionally connected to control a monostable multivibrator 21 having an astable period which is longer than the duration of either of the single shots 5 and 6, as aforedescribed (line 3 in FIG. 2a). Letting aside for the moment the temperature control, the single shot 21 provides a signal or fixed duration which determines the absolute value of the turning-on period for load current through thyristor T1 independently from frequency. Accordingly, the output of multivibrator 21, particularly the trailing edge thereof, is subject to the differentiation by trailing edge differentiator 4, which, in turn, triggers single shot 6 (lines 4 and 6 in FIG. 2a respectively). The output pulses of single shot 6 control thyristor T2 for load current turnoff as aforedescribed.

It appears, therefore, that each period of current conduction in thyristor T1 is determined by the period of monostable vibrator 21 which is triggered concurrently with each turning-on pulse, and its trailing edge produces the turnoff signal for load current flow. Upon adjusting device 1, the duty cycle of the intermittent control is adjusted, and the duty factor is adjusted indirectly therewith, because each period of load current flow remains constant as long as the astable period of monostable multivibrator 21 remains constant. For this embodiment the temperature sensing resistor 2 is incorporated in the RC circuit which is responsible for the astable period of monostable multivibrator 21. Therefore, each period of load current conduction is directly subject to temperature control. As long as the adjustment of the operating frequency by means of device 1 remains constant, the duty factor is adjusted by the temperature sensor by direct adjustment of a time interval between the turn-on and the turnoff pulse for the load control circuit. The temperature control in this embodiment may be operating over an extended range, including the normal range. However, for this embodiment, resistor 2 may, for example, be selected such that in the normal operating and temperature range, its resistance changes very little with temperature, but as the critical temperature range is approached (critical with regard to thyristor T1) the resistance changes considerably with temperature to provide temperature dependent control of load current turn-on period and duty factor.

In accordance with still another embodiment of the present invention, to be described with reference to FIG. 3, the underlying principle realized here is a change in the phase difference between start and turning-off pulses by external control, while an override turnoff pulse sequence is produced directly in dependence upon temperature of load current switching thyristor T1. The circuit of FIG. 3 has several features similar to the circuit shown in FIG. 1, the sawtooth generator 10 provides an output which is combined with the external control signal from device 1 in the negative summing device 15. Also, there is a Schmitt trigger 16 to which are coupled elements 3, 4, 5 and 6, performing the same function as was described above with reference to FIG. 1 (see also lines 3, 4, 5 and 6 in FIG. 3a).

The circuit as described thus far does not include temperature control. The temperature control is introduced into this system in that the output of leading edge differentiator 3 triggers additionally another monostable device 31. Monostable device 31 is not a regular monostable multivibrator, but has a reset feature in that it can be reset to restart a new astable period before the previous one has run. One can think of device 31 as a combination of reset integrator and Schmitt trigger.

The astable period of this monostable device 31 has its time constant adjusted by the temperature dependent signal, i.e., resistor 2 is included in its timing circuit. The adjustment is made such that normally the astable period exceeds the duty cycle. Therefore, for normal operating temperatures, device 31 is retriggered before its period has run (see line 7 in FIG.3a), but that period is started anew. A trailing edge differentiator 32 is connected to the output side of device 31, which can trigger a single shot 8 for providing alternative stop signals to thyristors T2. However, the control exerted by the temperature dependent signal upon monostable device 31 in the normal temperature range prevents single shot 8 from being triggered, as there is not trailing edge in the output monostable device 31. This way, the entire duty cycle period (which is constant) is available for normal load and load current duration adjustment, and the temperature dependent override for the premature load current turnoff is not effective.

Upon increase in temperature of thyristor T1, the astable period of device 31 is shortened to the point that its period has run before retriggering, so that within certain ranges of temperature, alternative turnoff pulses are produced by the single shot 8. These, however, will be effective as turnoff pulses only if appearing before the normal turnoff pulses as produced by single shot 6. The sequence of these turnoff pulses depends on the load adjustment by device 1 for any given, rather high temperature. In other words, the temperature control becomes effective only if a signal from Schmitt trigger 16 has a duration for determining each period of load current conduction, which exceeds the astable period of monostable device 31 as adjusted by temperature dependency of resistance 2. Line 8 in FIG. 3a shows two pulses as produced by single shot 8. The one to the left is ineffective as it falls in a period of nonconduction of thyristor T1 (which in this embodiment is equal to a pulse pause of the Schmitt trigger output shown in line 2). The pulse to the right in line 8 falls within a period of load current conduction, and, therefore, is operative as load current turnoff pulse.

The final example used to explain the principles and varieties of the present invention combines external and temperature controls for duty cycle variation leaving the turning-on period independent from either control. Therefore, in this embodiment, device 1, as well as the resistor 2, are incorporated in the RC network of a multivibrator 40 of the astable type. The frequency of the multivibrator is dependent upon both, external adjustment and temperature sensing.

Figure 4:
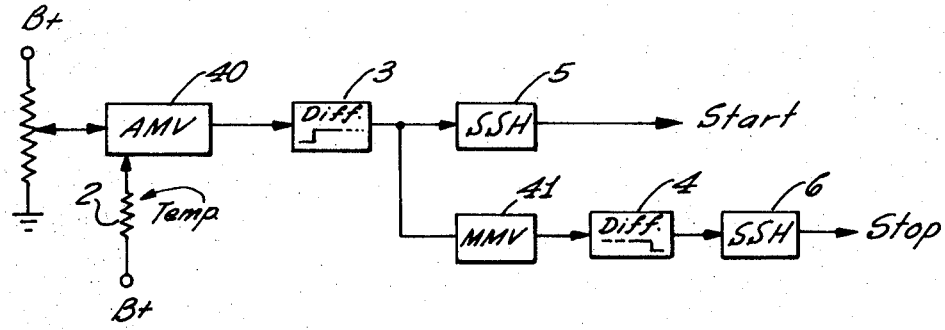
FIG. 4 illustrates a block diagram of still another embodiment of the present invention.
Figure 4A:
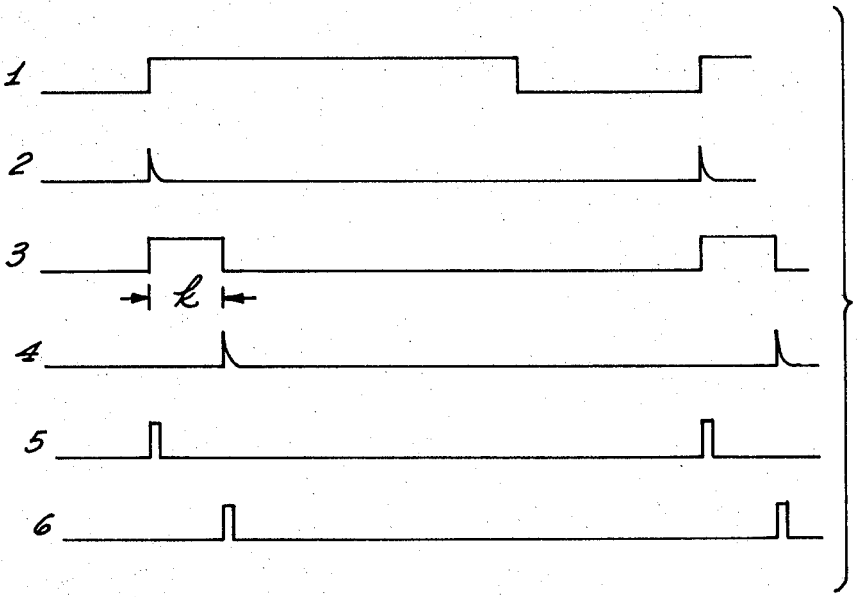
FIG. 4a illustrates waveforms of relevant signals developed in the circuit shown in FIG. 4.

In this embodiment, there is again provided the leading edge differentiator circuit 3 connected to the astable multivibrator 40 and its output pulses (line 2 in FIG. 4a) provide trigger signals for single shot 5 for start control (line 5). In addition, the output pulses of differentiator 3 trigger a single shot or monostable multivibrator 41 providing a signal of duration K as shown in line 3 of FIG. 4a. Trailing edge differentiator 4 connects to the output side of monostable multivibrator 41 to produce the pulses shown in line 4 of FIG. 4a and again, the stop signal generator, single shot 6 responds to the trailing edge differentiating pulses. As a consequence, the time relationship between two turn-on turnoff pulses remains the same, but the time delay between a turnoff pulse and the next turning-on pulse is controlled by the dual frequency control from devices 1 and 2.

The temperature dependent resistor 2 is preferably a nonlinear one, so that under normal temperature conditions below the danger range, multivibrator 40 is practically exclusively under control of device 1. Only when the danger range is approached, resulting variations of resistor 2 cause the frequency of the multivibrator to decrease so that the load current pulses of constant duration K follow each other less frequently.

It can, therefore, be seen that in all these embodiments, an astable device is used with advantage, which is preferably of the RC type, constituting from a more general point of view a relaxation oscillator. These devices determine the rate of intermittent operation. A monostable RC generator, preferably also the relaxation type, is provided. For permanent or occasional control of the load current period these two types of timing devices can be characterized by certain periods, oscillation period in one, astable period in the other, whereby the astable device produces individually adjustable on and off periods, which are likewise available as operating parameter. These three parameters are used to determine duty cycle and normal duty factor, the temperature control providing combined or separate control of the duty factor permanently or as an occasional override. At least one of these periods is controlled through the external control signal generator (1) and/or a signal depending upon the temperature of the load current switching semiconductor.

If the astable device is of the sawtooth type, one of the two control signals can serve as a variable reference signal to be compared with the gradual slope portion of the sawtooth signal for obtaining controlled phase of one or both of the types of switching pulses needed in the load switching circuit. This, however, can be regarded as equivalent to an astable multivibrator with adjustment of its on or off period. In either case, frequency adjustment is readily available for duty cycle adjustment, and duty factor control is derived either from the astable device also and, for example, via an output comparator (such as summing network 15) or from the monostable device directly or indirectly by duty cycle control with constant turn-on period of the load current (or a temperature controlled duration of that period). The monostable device determines the phase of the normal and/or of the temperature dependent override load current turnoff pulse, unless the temperature controls duty cycle.

While a simple variable resistor has been shown as device for the development of the external control signal, such signal can be developed in any other suitable way, including, for example, the provision of a variable capacitor for time constant determination of the RC circuit in a relaxation oscillator as used for the astable and the monostable device. In case a different type of oscillator is used, having, for example, an inductance, external control can be provided through variation of the inductance. As was mentioned above, temperature dependent resistors are preferably used as sensors for the temperature of the load current switching semiconductor T1. This resistor 2 has preferably been chosen to obtain a dynamic range for extensive variations of resistance with temperature within the particular temperature range just below the critical limit temperature of the semiconductor switch and minor or no variations in resistivity with temperature in the normal operating range, well below the "temperature of destruction" of the load current switching thyristor T1. Such temperature characteristics for the resistor will be used preferably in those cases where the temperature control is effective throughout.

Employment of additional nonlinear circuit elements or employment of balancing circuit networks connected to temperature sensor 2 permits the system to be adjusted to have very little resistance change in temperature in range well below the critical range so that as long as operating temperature is well below the critical range, the temperature control influences very little the control exerted upon the system by the control signal providing device 1. However, this latter precaution may not be needed in cases such as shown in FIGS. 1 and 3. Generally, in cases where the temperature control is directly or indirectly effective only as override near the danger zone, behavior of the resistor in the low temperature region is of lesser significance.

The circuit blocks employed, are conventional monostable and astable multivibrators, Schmitt triggers, including threshold detectors and differentiating circuits and are, for example, shown in Transistor Manuals, such as the RCA Manual (McGraw Hill), pages 68, 378, 380 and 381, or the G.E. Transistor Manual, pages 199 to 201, and others.

The invention is not limited to the embodiments described but all changes and modifications thereof not constituting departures from the spirit and scope of the invention are intended to be covered by the following claims.

I claim:

1. In combination with a control circuit for providing intermittent operation of a load in supplying power to the load intermittently from a source of DC potential and using a pulse controlled semiconductor element such as a thyristor for the control and switching of load current and including means to turn the semiconductor element on in response to turn-on pulses when received, and including means connected to the semiconductor element and operating in response to turnoff pulses when received to turnoff load current flow in the semiconductor element, comprising:

first means including oscillator means and means for driving a train of pulse pairs, from the oscillator means, the first means connected to the means (a) so that the respective first pulse of a pair as provided turns load current flow in the semiconductor element on, and further connected to the means (b) so that the respective second pulse of a pair as provided turns the load current flow in the semiconductor element off;

second means disposed for sensing the temperature of the semiconductor element and providing signals representative thereof; and third means connecting the second means to the first means for controlling the production of at least one of the pulses of a pair, for decreasing the period between turn-on and turnoff of the element as represented by turn-on and turnoff pulses of a pair, corresponding to an increase between turnoff and subsequent turn-on so as to decrease the duty factor of the semiconductor element with increasing temperature thereof as sensed by the second means and at least in a particular temperature range.

2. The combination as set forth in claim 1, including fourth means connected to the first means for adjusting the duty factor for load control, one of the second and fourth means controlling the phase of the pulses of a pair relative to each other, the other one of the second and fourth means controlling the oscillating means for control of the frequency of the pulse pairs.

3. The combination as set forth in claim 2, one of the second and fourth means controlling the first means to change the frequency of the turn-on pulses only, thereby varying the duty factor, the other one of the second and fourth means controlling the first means to change the delay between a pulse pair independently from frequency.

4. The combination as set forth in claim 2, one of the second and fourth means controlling the first means to change the frequency of the turn-on and turnoff pulses without changing the duty factor, the other one of the second and fourth means controlling the first means to change the phase of the pulses of a pair; and including means to limit the period of delay between the pulses of a pair effective as switching pulses.

5. The combination as set forth in claim 1, including fourth means adjustable for duty factor and load current control and connected to the first means for controlling the delay between the pulses of a pair, the first means providing regular turnoff pulses and substitute turnoff pulses, the respective earlier one of two turnoff pulses being effective in the means (b), the third means including means connected to operate the fifth means in response to operation of the second means and in further response to the turn-on pulses of each pair to control the providing of substitute turnoff pulses in dependence upon temperature, the substitute turnoff pulses respectively effective in the means (b) if earlier then the regular turnoff pulse as provided by the first means, when the temperature of the semiconductor element is in a particular range.

6. A circuit as set forth in claim 1, the third means operating the first means to change the occurrence of the pulses of a pair similarly in response to the signal provided by the second means, and including fourth means providing for external adjustment and connected to the first means to control the delay of a regular turnoff pulse as succeeding a turn-on pulse, and constituting the turnoff pulse of a pair for relatively low temperatures and operative in response to such external adjustment, and including fifth means responsive to each turn-on pulse to provide an overriding turnoff pulse to be effective if the regular turnoff pulse provided by the first means occurs later.

7. The combination as set forth in claim 1, the third means connected to the first means for adjustment of the duty cycle in response to operation of the second means controlling the first means to change the frequency of the turn-on pulses only, thereby varying the duty factor, the delay between the pulses of a pair remaining independent from the frequency thereof.

8. The combination as set forth in claim 7, including means for adjusting the frequency of the pulse pairs additionally in response to external duty factor adjustment.

9. The combination as set forth in claim 1, the second means controlling the first means to change the frequency of the turn-on and of the turnoff pulses without changing the duty factor; and including means to limit the period of delay between the pulses of a pair effective as switching pulses.

10. The combination as set forth in claim 1, including fourth means providing for external adjustment and connected to the first means to control the delay of a turnoff pulse of a pair relative to the respective turn-on pulse of the pair, in response to such external adjustment for duty factor control independent from duty cycle frequency, the third means including a pulse generator connected to the first means to operate in response to each turn-on pulse, and further connected to the means (b) to provide substitute turnoff pulses independent from the regular turnoff pulse as provided by the first means and occurring earlier than the latter turnoff pulses when the second means senses temperature in a particular range and when the fourth means is adjusted for relative high duty factor.

11. The combination as in claim 10, the pulse generator means operating directly in response to the second means to render the relative occurrence of each substitute turnoff pulse dependent upon temperature.

12. The combination as in claim 10, the third means operating the oscillating means of the first means so that the frequency of turn-on and turnoff pulses are dependent upon temperature, the pulse generator providing a fixed delay between each turn-on pulse and the respective next substitute turnoff pulse as produced.

13. The combination as set forth in claim 1, including fourth means providing for external adjustment and connected to the oscillating means of the first means to control the frequency of the turn-on pulses, the first means causing the turnoff pulses to follow at a delay period which is independent from the frequency adjustment by the fourth means, the third means operating the first means in response to the second means, to render relative occurrence of a turn-on pulse as succeeding a turnoff pulse dependent upon temperature as sensed by the second means and to be effective in a particular range of elevated temperatures only.

14. The combination as set forth in claim 13, the third means operating also the first means, to obtain temperature depending variation in frequency of the turn-on pulses, the said delay being provided by a constant delay generator.

15. The combination as set forth in claim 13, the first means including a delay generator as between the pulses of a pair, the third means operating to vary the delay period as provided by the generator.

16. In combination with a control circuit for providing intermittent operation of a load in supplying power to the load intermittently from a source of DC potential and using a pulse controlled semiconductive device for switching of a load current, and including means (a) to turn the semiconductor element on in response to turn-on pulses when received, and including means (b) connected to the semiconductor element and operating in response to turnoff pulses when received to turnoff load current flow in the semiconductor element, comprising:

first means for providing free running oscillations in representation of the duty cycle for the intermittent operation;

second means connecting the first means to the means (a) for providing turn-on pulses in synchronism with the oscillations;

third means connecting the first means to the means (b) and operating in synchronism with the turn-on pulses as provided by the second means to provide turnoff pulses in particular timed and interspaced relation to the turn-on pulses; and fourth means responsive to the temperature of a semiconductor device switching load current and connected to at least one of the first, second and third means for controlling the timing between the turn-on and the respective next turning-off pulse.

17. The combination as set forth in claim 16, including means connected to provide substitute turnoff which are delayed relative to turnoff pulses as provided by the second means for temperature in a relative low range, while the timing is reversed in a range of relatively high temperatures.

18. The combination as set forth in claim 16, the fourth means operating the third means so that the relationship between a turnoff pulse and the respective succeeding turn-on pulse varies with temperature significantly only in a particular range of temperatures dangerous for the semiconductive device.

19. The combination as set forth in claim 16, the first means including a RC frequency generator, the fourth means controlling the time constant thereof.

20. The combination as set forth in claim 16, the third means including a monostable device with a RC circuit combination, the fourth means controlling the time constant thereof.